United States Patent
Li et al.

(10) Patent No.: US 8,987,350 B2
(45) Date of Patent: Mar. 24, 2015

(54) AQUEOUS COATING COMPOSITION FOR IMPROVED LIQUID STAIN REPELLENCY

(75) Inventors: Juan Li, Shanghai (CN); Tao Wang, Geelong (AU); Tao Wang, Shanghai (CN); David G. Speece, Jr., North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/564,872

(22) Filed: Aug. 2, 2012

(65) Prior Publication Data

US 2013/0035430 A1 Feb. 7, 2013

(30) Foreign Application Priority Data

Aug. 5, 2011 (CN) .......................... 2011 1 0230508

(51) Int. Cl.
| | |
|---|---|
| *C08K 9/10* | (2006.01) |
| *C09D 5/00* | (2006.01) |
| *C09D 5/02* | (2006.01) |
| *C09D 191/06* | (2006.01) |
| *C09D 5/16* | (2006.01) |
| *C09D 7/12* | (2006.01) |
| *C08L 91/08* | (2006.01) |

(52) U.S. Cl.
CPC .............. *C09D 5/028* (2013.01); *C09D 191/06* (2013.01); *C09D 5/1637* (2013.01); *C09D 7/1225* (2013.01); *C09D 7/125* (2013.01); *C08K 9/10* (2013.01); *C08L 91/08* (2013.01)
USPC .......................................... 523/205; 524/475

(58) Field of Classification Search
CPC ........ C08K 9/10; C08L 91/06; C09D 191/06; C09D 7/125
USPC ....................................................... 523/205
See application file for complete search history.

(56) References Cited

U.S. PATENT DOCUMENTS

| | | | |
|---|---|---|---|
| 5,037,475 A | 8/1991 | Chida et al. | |
| 5,360,827 A | 11/1994 | Toda et al. | |
| 5,431,956 A * | 7/1995 | Robb et al. ..................... | 427/220 |
| 5,609,965 A | 3/1997 | Esser | |
| 5,635,279 A | 6/1997 | Ma et al. | |
| 6,066,379 A | 5/2000 | Ma et al. | |
| 6,869,996 B1 | 3/2005 | Krajnik et al. | |
| 7,479,323 B2 | 1/2009 | Rathschlag et al. | |
| 7,579,081 B2 | 8/2009 | Brown | |
| 2010/0063171 A1 | 3/2010 | Roschmann et al. | |
| 2010/0256260 A1 | 10/2010 | Liu et al. | |
| 2010/0298483 A1 | 11/2010 | Allen et al. | |

FOREIGN PATENT DOCUMENTS

| | | |
|---|---|---|
| CN | 101538438 A | 9/2009 |
| EP | 0022633 A2 | 1/1981 |
| EP | 0404184 A2 | 12/1990 |
| EP | 0915108 A1 | 5/1999 |
| EP | 0959176 A1 | 11/1999 |
| EP | 0820477 B1 | 1/2002 |
| GB | 2111522 A | 7/1983 |
| JP | 2007161823 A | 6/2007 |
| JP | 2008105919 A | 5/2008 |
| JP | 04507043 A | 7/2010 |
| WO | 0068304 A1 | 11/2000 |
| WO | 2006037161 A1 | 4/2006 |
| WO | 2007/112503 A1 | 10/2007 |
| WO | 2008/075049 A1 | 6/2008 |
| WO | 2010074865 A1 | 7/2010 |

OTHER PUBLICATIONS

Machine translation of CN 101538438 A, Sep. 23, 2009.*

* cited by examiner

*Primary Examiner* — Vickey Nerangis
(74) *Attorney, Agent, or Firm* — Karl E. Stauss; Cantor Colburn LLP

(57) ABSTRACT

The present invention relates to a coating composition, especially, relates to an aqueous coating composition with improved liquid stain repellency, it has a fraction of critical pigment volume concentration of from 35% to 110%, and comprises (i) pigment composition, including 15 wt. %-100 wt. %, in percentage by weight based on the dry weight of the pigment composition, polymer-encapsulated pigment; and 0-85 wt. %, in percentage by weight based on the dry weight of the pigment composition, un-encapsulated pigment; and (ii) 0.01 wt. %-5 wt. %, in percentage by dry weight based on the wet weight of the aqueous coating composition, at least one paraffin wax emulsion.

12 Claims, No Drawings

US 8,987,350 B2

AQUEOUS COATING COMPOSITION FOR IMPROVED LIQUID STAIN REPELLENCY

BACKGROUND

The present invention relates to a coating composition, especially, relates to an aqueous coating composition with improved liquid stain repellency.

Stain resistance/removal is one of the key performances requirements for coating films. The stain resistance/removal refers to the resistance to stain, difficulty of being wetted by stain, difficulty of being adhered by stain and easiness of stain removal, includes but is not limited to, hydrophilic stain resistance, hydrophobic stain resistance, hydrophilic and hydrophobic stain removal, and hydrophilic stain repellency, such as beading effect to hydrophilic stain.

Currently, beading effect is achieved by adding additives to reduce surface tension of paint films. Among them, wax emulsion is the most popular one. However, the beading efficiency of the emulsified wax which can provide beading effect is because wax can migrate onto the dried coating film surface and reduce surface tension, which will make the stains hardly wet coating film. This phenomenon is called stain repellency or beading effect. Anything stops wax migrating onto the coating film surface will reduce beading efficiency. So it is not difficult to understand that the beading efficiency of wax emulsion is influenced substantially by the coating formulation. For example, when PVC of formulations is increased, higher level of wax emulsion has to be used to achieve beading effect, but such high level of wax emulsion usage compromises other performances of coating films.

Surprisingly, it has been found that using polymer-encapsulated pigments partially or fully replaces mineral pigments in a water based paint formulation can improve the beading efficiency of wax emulsions. On the other side, the wax level could be decreased to avoid compromising performance of coating film and save cost.

U.S. Pat. No. 7,579,081 B2 disclosed polymer-encapsulated pigments that include certain pigments substantially encapsulated with a first and a second polymer, and a coating composition comprising the polymer-encapsulated pigments. Inventors for U.S. Pat. No. 7,579,081 B2 never considered the possibility of combining the use of the disclosed polymer encapsulated pigment with wax in coating compositions to achieve incredible stain resistance/removal function.

It is therefore, still desired in the art to get to a novel coating composition, especially, aqueous coating composition that has more efficient stain resistance/removal function and also under a reasonable and controllable cost.

STATEMENT OF INVENTION

The present invention provided an aqueous coating composition has a fraction of critical pigment volume concentration of from 35% to 110%, it comprises: (i) pigment composition, including 15 wt. %-100 wt. %, in percentage by weight based on the dry weight of the pigment composition, polymer-encapsulated pigment; and 0-85 wt. %, in percentage by weight based on the dry weight of the pigment composition, un-encapsulated pigment; and (ii) 0.01 wt. %-5 wt. %, in percentage by dry weight based on the wet weight of the aqueous coating composition, at least one paraffin wax emulsion.

DETAILED DESCRIPTION

For the purpose of describing the components in the compositions of the present invention, all phrases comprising parenthesis denote either or both of the included parenthetical matter and its absence. For example, the phrase "(co)polymer" includes, in the alternative, polymer, copolymer and mixtures thereof; the phrase "(meth)acrylate" means acrylate, methacrylate, and mixtures thereof.

As used herein, the term "aqueous" shall mean water or water mixed with 50 wt % or less, based on the weight of the mixture, of water-miscible solvent.

As used herein, the term "polymer" shall include resins and copolymers.

As used herein, the term "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, unless otherwise indicated, the term "average particle size (or diameter)" refers to the median particle size (or diameter) of a distribution of particles as determined by electrical impedance using a MULTISIZER™ 3 Coulter Counter (Beckman Coulter, Inc., Fullerton, Calif.), per manufacturer's recommended procedures. The median is defined as the size wherein 50 wt % of the particles in the distribution are smaller than the median and 50 wt % of the particles in the distribution are larger than the median. This is a volume average particle size.

As used herein, unless otherwise indicated, the term "Tg" shall mean glass transition temperature measured by differential scanning calorimetry (DSC) using a heating rate of 20° C./minute and taking the inflection point in the thermogram as the Tg value. The term "calculated Tg" refers to the Tg of polymers determined via the Fox equation (T. G. Fox, Bull. Am. Physics Soc., Volume 1, Issue No. 3, page 123(1956)). The Tgs of homopolymers may be found, for example, in "Polymer Handbook", edited by J. Brandrup and E. H. Immergut, Interscience Publishers. In the case of a multi-stage polymer, the reported Tg value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

The aqueous coating composition with improved stain resistance in the present invention comprises a pigment composition, including 15 wt. %-100 wt. %, preferably from 25 wt. % to 100 wt. %, most preferably from 30 wt. %-100 wt. %, in percentage by weight based on the dry weight of the pigment composition, polymer-encapsulated pigment; and 0 wt. %-85 wt. %, preferably from 0 wt. % to 75 wt. %, most preferably from 0 wt. % to 70 wt. %, in percentage by weight based on the dry weight of the pigment composition, un-encapsulated pigment.

In one embodiment of the present invention, the polymer shell of the said polymer-encapsulated pigment has an average thickness of 10 nanometers to 200 nanometers, preferably from 30-150 nanometers, more preferably from 40-120 nanometers. SEM and TEM images can accurately measure the shell thickness.

In another embodiment of the present invention, the polymer shell of the said polymer-encapsulated pigment has a minimum film formation temperature (MFFT) from −35° C. to 60° C. preferably from −20° C. to 40° C., and more preferably from −15° C. to 30° C. The MFFT measurement is carried out by drawing down a film of the dispersion onto a metal bar subjected to a thermal gradient and then passing dry air over the dispersion until the film is dry. The MFFT is taken to be the minimum temperature where one observes a clear and crack-free film. It is not uncommon in the coatings industry to assume that a substantial extent of polymer diffusion takes place at temperatures above but not far removed from the MFFT.

The polymer shell composition, particle size, particle morphology and process to make such are described, un-exclusively, in for example U.S. Pat. No. 7,579,081 B2; WO2006/037161A1; WO2010/074865 A1; JP2008105919A; GB2111522A. Preferably, polymer-encapsulated pigments are made by emulsion polymerization as taught in U.S. Pat. No. 7,579,081 B2 and WO2006/037161A1.

In one embodiment of the present invention, the polymer shell of the said polymer-encapsulated pigment is an aqueous dispersion of polymer/pigment composite. The polymer shell encapsulating the polymer-encapsulated pigment comprises, at least one copolymerized ethylenically unsaturated nonionic monomer. Herein, "nonionic monomer" means that the copolymerized monomer residue does not bear an ionic charge between pH=1-14. The ethylenically unsaturated nonionic monomers used in the present invention include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Preferably, the polymer shell of the polymer encapsulated pigment of the present invention further comprises up to 10%, preferably up to 5%, by weight based on the dry weight of the copolymer, of an ethylenically unsaturated monomer carrying at least one functional group selected from carboxyl, carboxylic anhydride, hydroxyl, amide, sulphonate, phosphonate and mixtures thereof. Examples of these types of monomers are ethylenically unsaturated carboxylic or dicarboxylic acids, especially acrylic or methacrylic acid, itaconic acid, maleic acid, or the amides, especially N-alkylolamides or hydroxyalkyl esters of the above-mentioned carboxylic acids, such as (meth)acrylamide, N-methylol(meth)acrylamide, 2-hydroxyethyl(meth)acrylamide, hydroxyethyl (meth)acrylate, and hydroxypropyl (meth)acrylate.

In this embodiment, the polymer shell of the polymer-encapsulated pigment further comprises, in percentage by weight based on the dry weight of the said polymer shell, up to 5%, preferably up to 3% of a surfactant to stabilize the growing polymer-encapsulated pigments during polymerization and to discourage aggregation of the polymer-encapsulated pigments in the resulting aqueous dispersion. One or more surfactants, including anionic and nonionic surfactants, and mixtures thereof, are commonly used. Many examples of surfactants suitable for emulsion polymerization are given in McCutcheon's Detergents and Emulsifiers (MC Publishing Co. Glen Rock, NF), published annually. Other types of stabilizing agents, such as protective colloids, are optionally used.

Polymer shell of the polymer-encapsulated pigment could also be comprised of other film formable polymers, like but not limited to polyurethane, epoxy resin, alkyd resin, or polyurethane-acrylic hybrid.

Conventional free radical initiators may be included such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and C4-C22 linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agent are typically used in the amount of 0 to 5 wt %, based on the total weight of monomer used to form the aqueous emulsion copolymer. A preferred level of chain transfer agent is from 0.01 to 0.5, more preferably from 0.02 to 0.4 and most preferably from 0.05 to 0.2 mole %, based on the total number of moles of monomer used to form the aqueous emulsion copolymer shell.

The aqueous dispersion of the polymer-encapsulated pigment can further comprise functional substances, like crosslinking agent, biocide, UV absorption agent, and others. The crosslinking agent could be similar to, but not limited to, the one disclosed in U.S. Pat. No. 6,869,996 B1, the one disclosed in EP0820477, or the one disclosed in U.S. Pat. No. 5,609,965.

The pigment particles, as encapsulated, are inorganic pigment or extender. As used herein, the term "pigment" refers to a particulate inorganic material which is capable of materially contributing to the opacity or hiding capability of a coating. Such materials typically have a refractive index of greater than 1.8 and include, but not limited to, titanium dioxide ($TiO_2$), zinc oxide, zinc sulfide, barium sulfate, barium carbonate. Preferred is titanium dioxide ($TiO_2$).

In a preferred embodiment where the pigment in the said polymer-encapsulated pigment is $TiO2$, the $TiO2$ in the polymer-encapsulated $TiO2$ has a weight percent to the total $TiO2$ in the aqueous coating composition from 50% to 100%, preferably from 80% up to 100%, and the pigment volume concentration of total $TiO2$ in the aqueous coating composition is from 5% up to 30%, preferably from 10% up to 25%.

As used herein, the term "extender" refers to a particulate inorganic material having a refractive index of less than or equal to 1.8 and greater than 1.3 and includes, for example, calcium carbonate, clay, calcium sulfate, aluminosilicates, silicates, zeolites, mica, diatomaceous earth, solid or hollow glass, and ceramic beads. The aqueous coating composition may optionally contain solid or hollow polymeric particles having a Tg of greater than 60° C., such polymeric particles are classified as extenders for purposes of PVC calculations herein. The details of hollow polymeric particles are described in EP22633, EP915108, EP959176, EP404184, U.S. Pat. No. 5,360,827, WO 00/68304, and US20100063171. The solid polymeric particles have particle size from 1-50 microns, preferably from 5-20 microns.

In a preferred embodiment, the pigment volume concentration of the polymer-encapsulated pigment in the coating composition is from 5% to 80%.

The existence of the polymer-encapsulated pigment is not limited to an aqueous dispersion. It could also be powder, or other which can be dispersed in the water per paint making and keep stable.

The preparation methods of the polymer-encapsulated pigment of the coating composition of the present invention can be any methods, familiar to the technical persons in the art. Suitable examples include, but not limited to those as disclosed in U.S. Pat. No. 7,579,081 B2, U.S. Pat. No. 7,357,949 B2.

In another embodiment of the present invention, the polymer-encapsulated pigment is prepared by first, dissolving the hydrophilic polymer in a suitable solvent; adding into the solution of the hydrophilic polymer the antimicrobial agent, preferably with agitation; adding the mixture of the antimicrobial agent in the hydrophilic polymer solution into an antisolvent, preferably with agitation; and finally, separating the polymer-encapsulated pigment from the liquid and dried.

Alternatively, the polymer-encapsulated pigment is prepared by treating the antimicrobial agent with a polymer precursor and then subsequent polymerization to prepare the hydrophilic polymer.

Another method of preparation of the polymer-encapsulated pigment is the compounding of the antimicrobial agent with the hydrophilic polymer and subsequent grinding of the compounded product to the desired particle size.

In one embodiment, the polymer-encapsulated pigment of the coating composition of the present invention can be prepared according to the steps: a) the particulate materials were first dispersed in water using a macro-RAFT copolymer as a stabilizer; b) monomer and water-soluble initiator were then added to the system, and the monomer polymerized to form the coating. (Hirose M, etc.; Journal of the Japan Society of Colour Material; Vol. 72; No. 12; Page 748-759)

Other methods for preparation the polymer-encapsulated pigment can also be used in the present invention, the above exemplary preparation methods are not for limitation.

The aqueous coating composition has a fraction of critical pigment volume concentration (FCPVC) of from 35 to 110%, preferably from 50 to 90%. As used herein, the term "fraction of critical pigment volume concentration (FCPVC)" refers to the ratio of the PVC to the estimated CPVC for the pigments involved. Here the PVC is the pigment volume concentration which could be calculated by the equation PVC=(pigment volume+extenders volume)/(pigment volume+binder volume+extenders volume). The CPVC of single pigment or extender could be calculated by oil adsorption, which is OA(vol)=the volume of linseed oil needed to wet 100 gram pigment/volume of 100 gram pigment. The CPVC of that pigment or extender is CPVC=1/(1+OA(vol)). In paint formulation, the pigment and extenders are mixture and it is hard to estimate the CPVC of the mixture. Therefore, the FCPVC in the present invention is calculated by the following equation: FCPVC=Sum over all pigments(or extenders)i (PVC(i)/CPVC(i)).

The aqueous coating composition of the present invention comprises 0.01 to 5%, preferably 0.01 to 1%, in percentage by dry weight based on the wet weight of the aqueous coating composition, at least one paraffin wax emulsion, preferably said emulsion is a melted refined paraffin wax, or its blend with other materials. In addition to the aqueous coating composition preparation, it is contemplated the paraffin wax emulsion can be also added during the copolymer dispersion preparation.

The typical paraffin waxes have a melt point temperature of 46 to 71° C. Solids of the final paraffin wax emulsion can vary from 1 to 60 wt. %; more typically, 30 to 55 wt. %. PH of the emulsion can range from 6 to 10, typically 7.9 to 9.8, but is dependent on the process used. The final particle size is dependent on a number of variables including the homogenization which is used at the end of the process. Particle size of the paraffin wax emulsion can vary between 0.02 to 1.5 microns. The particle size for paraffin wax alone is typically 0.1 to 0.8 microns.

The paraffin wax emulsion can also be a blend of paraffin wax with other materials, such as polyethylene wax, carnauba wax, or ethylene acrylic acid copolymer. Examples of blends from Michelman Inc. are Michem emulsion 62300, a blend of paraffin wax and polyethylene, Michem emulsion 34935, a blend of paraffin wax and ethylene acrylic acid copolymer, and Michem Lube 1870, a commercial blend of paraffin wax and carnauba wax.

The paraffin wax emulsion can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be stirred into the wax emulsion at the elevated temperature. A base, such as potassium hydroxide or ammonium hydroxide, can then be dissolved in ethylene glycol or water at elevated temperatures and slowly added to the wax blend while increasing agitation speed of the mixer. After all the water/base mixture has been added to the molten wax, the resulting wax in water emulsion can be passed through a homogenizer to further adjust particle size of the emulsion. After homogenization, the resulting emulsion is cooled, for example, through a heat exchanger, and then filtered and packaged. Michem Emulsion 62330, Michem Emulsion 77030, Michem ME 70950 or Michem ME 71450, supplied by Michelman Inc, are examples of a commercially available paraffin wax emulsion that can be used in the blend of the present invention.

The amount of paraffin wax emulsion is in the range of 0.01 to 5%, by dry weight based on the wet weight of the aqueous coating composition. Higher level of paraffin wax emulsion may lead to a stronger repellency to hydrophilic stain. Hydrophilic stain repellency refers to the surface of dry coatings can provide strong hydrophobicity which can prevent hydrophilic stain wet and/or adhere to coatings surface.

The paraffin wax is preferred here to be added as emulsion, but it could also be added by other methods. U.S. Pat. No. 4,368,077 disclosed a latex containing a wax additive to provide high resistance to penetration by water be provided by first dissolving the wax in one of the monomers to be emulsion polymerized to form said latex.

The aqueous coating composition of the present invention contains at least one conventional coatings adjuvant, including but not limited to, coalescing agents, cosolvents, surfactants, buffers, neutralizers, thickeners, non-thickening rheology modifiers, dispersants, humectants, wetting agents, midewcides, biocides, plasticizers, antifoaming agents, defoaming agents, anti-skinning agents, colorants, flowing agents, crosslinkers, anti-oxidants.

Thickeners for use herein include but not limited to polyvinyl alcohol (PVA), hydrophobically modified alkali soluble emulsions (HASE), alkali-soluble or alkali swellable emulsions (ASE), hydrophobically modified ethylene oxide-urethane polymers known in the art as HEUR, and cellulosic thickeners such as hydroxymethyl cellulose (H MC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose. Also useful as thickeners are fumed silica, attapulgite clay and other types of clay, titanate chelating agents.

Dispersants for use herein include non-ionic, anionic and cationic dispersants such as polyacid with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. Prefer the polyacids with suitable molecular weight. The polyacids used here are such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof. The molecular weight of such polyacids dispersant is from 400 to 50,000, or from 400 to 30,000, prefer 500 to 10,000, more prefer 1,000 to 5,000 and most prefer 1,500 to 3,000.

Antifoaming agents and/or defoaming agents for use herein include but not limited to silicone-based and mineral oil-based defoamers. Surfactants for use herein include anionic, nonionic, cationic surfactants and amphiphilic surfactant. Prefer anionic and nonionic surfactants and more prefer nonionic surfactant.

Suitable coalescing agents, plasticizers, and other optional cosolvents include but not limited to ethylene glycol, propylene glycol, hexylene glycol, 2,2,4-trimethyl-1,3-pentanediol monoisobutyrate (TEXANOL™), Coasol™, glycol ethers, mineral spirits, methyl carbitol, butylcarbitol, phthalates, adipates.

The aqueous coating composition, in addition to the polymer encapsulating the polymer-encapsulated pigment, may also contain one or more additional water dispersible or soluble polymers, with an average particle diameter of from 50 to 800 nm and a minimum film formation temperature of from −35° C. to 60° C. The water dispersible or soluble polymers are copolymerized from the ethylenically unsaturated monomer wherein the ethylenically unsaturated monomers used in the present invention include but not limited to, for example, (meth)acrylic ester monomers, where (meth) acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylic acid, (meth)acrylonitrile; (meth) acrylamide; amino-functional and ureido-functional monomers; monomers bearing acetoacetate-functional groups; monomer bearing epoxy group; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride. Or said water dispersible or soluble polymer could be epoxy polymer, poly urethane dispersion, polyurethane acrylic hybrid, alkyd polymer, hybrids or blends between those polymers. Inorganic/organic hybrids or inorganic binder like acid form or neutralized silica sol and organic modified silica sol also can be blended in the aqueous coating composition of current invention.

Chain transfer agents are optionally added to the aqueous reaction medium to control molecular weight of the polymer. Examples of chain transfer agents include mercaptans, polymercaptans, and polyhalogen compounds including alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% by weight, based on the weight of the monomers in the monomer mixture, is used.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent.

The aqueous coating composition formulating involves the process of selecting and admixing appropriate coating ingredients in the correct proportions to provide a paint with specific processing and handling properties, as well as a final dry paint film with the desired properties.

The aqueous coating composition may be applied by conventional application methods such as, for example, brushing, roller application, and spraying methods such as, for example, air-atomized spray, air-assisted spray, airless spray, high volume low pressure spray, and air-assisted airless spray.

Suitable substrates include, but not limited to, for example, concrete, cement board, MDF and particle board, gypsum board, wood, stone, metal, plastics, wall paper and textile, etc. preferably, all the substrate are pre-primed by waterborne or solvent borne primers.

The aqueous coating composition and its application method may influence the effectivity of this patent. When the hydrophilic substances in aqueous coating compositions are too much, then the property of the liquid stain repellency is poor. Similarly, in its application, when the concentration of hydrophilic substances on the dry paint film surface is too much, the property of the liquid stain repellency is poor.

EXAMPLES

I. Raw Materials

TABLE 1

| A) Monomers used in making Polymer compound | |
|---|---|
| Compound | Chemical Nature |
| BA | Butyl Acrylate |
| ST | Styrene |
| MMA | Methyl Methacrylate |
| AA | Acrylic Acid |
| IA | Itaconic Acid |
| VA | Vinyl Acetate |
| VV-10 | Vinyl Versatate |
| AAEM | 2-(Acetoacetyloxy)ethyl Metharylate |
| EHA | Ethyl Hexyl Acrylate |
| AM | Acrylamide |
| Norsocryl 102 | An imidazolidone ethyl methacrylate solution in methyl methacrylate |
| BP | Benzophenone |
| SVS | Sodium Vinyl Sulfonate |

TABLE 1-continued

B) Starting materials used in paint formulation

| Material | Function | Chemical nature | Supplier |
|---|---|---|---|
| Kathon™ LXE | Biocide | Methyl- and chloroisothiazolinone | Dow |
| Tego™ Foamex 825 | Defoamer | Polyether siloxane copolymer | Degussa |
| Propylene Glycol | Solvent | Propylene glycol | |
| AMP-95 | Base | 2-methyl-2-amino-propanol | Dow |
| Orotan ™ 1288 | Pigment dispersant | Polyacid | Dow |
| Triton™ CF-10 | Wetting agent | Nonionic surfactant | Union Carbide |
| Ropaque™ Ultra E | Opaque polymer | polystyrene | Dow |
| Acrysol™ TT-935 | Rheology Modifier | Hydrophobically modified polyacid | Dow |
| Natrosol 250 MBR | Rheology Modifier | Hydroxyethyl Cellulose | Aqualon |
| Ti-Pure™ R-706 | Pigment | Titanium dioxide | DuPont |
| DB-80 | Extender | Clay Calcined | Guangfu Building Materials Group (China) |
| CC-700 | Extender | Calcium carbonate | Guangfu Building Materials Group (China) |
| CC-1000 | Extender | Calcium carbonate | Guangfu Building Materials Group (China) |
| Texanol™ | Coalescent | Trimethylpentanediol isobutyrate | Eastman |

II. Test Procedures

Hydrophilic Stain Repellency of Dry Coatings

Hydrophilic stain repellency evaluates the difficulty of wetting the coating surface for hydrophilic stains. To determine the hydrophilic stain repellency, cast test paint on a black vinyl chart P-121-10N (Leneta), or on the substrate of ceramic, metal, plastic, and cementitious panel. Let the paint to dry for 7 days. Keeping the coated substrate vertical, allow the hydrophilic stain drops flow from the upper to bottom side of substrate coated with the test paint. Hydrophilic stain repellency is observed by eye and represented by the hydrophilic stain repellency No. shown in Table 2.

TABLE 2

| Hydrophilic stain repellency No. | State |
|---|---|
| 10 | No wetting nor adhesion of water droplets observed on the coating surface |
| 8 | 1/3 wetting area observed by individual small circular water |
| 6 | 3/4 wetting area observed by individual small circular water |
| 5 | Wetting observed by individual small circular water droplets observed on the coating surface |
| 4 | Wetting observed by individual small elliptic water droplets observed on the coating surface |
| 3 | Wetting observed by individual large water droplets observed on the coating surface |
| 2 | Wetting observed along the discrete track of hydrophilic stains on the coating surface |
| 1 | Wetting observed along the thinner track of hydrophilic stains on the coating surface |
| 0 | Wetting observed along the entire track of hydrophilic stains on coating surface |

Example 1

Composition of Aqueous Dispersion of Polymer Encapsulated Pigment

TABLE 3

| | | Dispersion Characteristics | | | |
|---|---|---|---|---|---|
| Dispersion ID | Shell Polymer Composition | WS$^a$ (%) | PLT$^b$ (nm) | PVC$^c$ (%) | MFFT$^d$ (° C.) |
| 1 | 55.6BA/41.1MMA/0.7AM/0.9IA/1.1Norsocryl 102/0.6BP | 56.7% | 70 | 23.9 | 5 |
| 2 | 58ST/36BA/2AA/4AAEM | 70.0% | 22 | 60 | 30 |
| 3 | 20VV-10/44.8VA/29BA/5EHA/1AM/0.2SVS | 62.9% | 165 | 8 | −5 |

$^a$WS = weight solids
$^b$PLT = polymer layer thickness
$^c$PVC = pigment volume concentration
$^d$MFFT = minimum film formation temperature of polymer
The pigment encapsulated is TiPure™ R-706.

Example 2

Composition of Aqueous Polymer Latex

TABLE 4

| | | Latex Characteristics | | | |
|---|---|---|---|---|---|
| Latex ID | Polymer Composition | WS (%) | PS$^e$ (nm) | pH$^f$ | MFFT (° C.) |
| 1 | 55.6BA/41.1MMA/0.7AM/0.9IA/1.1Norsocryl 102/0.6BP | 50% | 105 | 8.0 | 5 |
| 2 | 58ST/36BA/2AA/4AAEM | 50% | 160 | 8.5 | 30 |
| 3 | 20VV-10/44.8VA/29BA/5EHA/1AM/0.2SVS | 55% | 300 | 5.6 | −5 |

$^e$PS = particle size
$^f$pH = pH of the latex after neutralization

Example 3

Preparation of Aqueous Coatings Composition

Paint 1

A paint containing aqueous dispersion of polymer-encapsulated pigment Dispersion 1 was prepared using the following procedure to form the aqueous coating composition Paint 1. The ingredients listed in Table 5 (let down) were added using a conventional lab mixer. The FPVC of the resulting paints is 35%.

TABLE 5

| 35% FCPVC Aqueous Coating Composition | |
|---|---|
| Material | Weight (g) |
| Paint formulation | |
| Letdown | |
| Dispersion 1 | 711.50 |
| Latex 1 | 153.62 |

TABLE 5-continued

35% FCPVC Aqueous Coating Composition

| Material | Weight (g) |
|---|---|
| Tego™ Foamex 825 | 0.97 |
| Primal™ TT-935 | 3.72 |
| AMP-95 | 0.48 |
| Kathon LXE | 1.00 |
| Water | 125.38 |
| Michem™ ME 62330 | 3.33 |
| Total | 1000 |

Paint characteristics

| FCPVC | 35% |
|---|---|
| Total PVC | 18% |

Paint 2

A paint containing no polymer-encapsulated pigment was prepared using the following procedure to form the aqueous coating composition Paint 2. The ingredients listed in Table 6 (grind) were mixed using a high speed Cowles disperser. The ingredients listed in Table 6 (let down) were added using a conventional lab mixer. The FPVC of the resulting paints is 35%.

TABLE 6

35% FCPVC Aqueous Coating Composition

| Material | Weight (g) |
|---|---|
| Paint formulation | |
| Grind | |
| Water | 116.00 |
| Propylene Glycol | 14.53 |
| Natrosol 250 MBR | 1.94 |
| AMP-95 | 0.48 |
| Orotan™ 1288 | 3.39 |
| Triton™ CF-10 | 0.97 |
| Foamaster NXZ | 0.97 |
| Ti-Pure™ R-706 | 231.16 |
| Letdown | |
| Latex 1 | 532.9 |
| Tego™ Foamex 825 | 0.97 |
| Primal™ TT-935 | 3.22 |
| AMP-95 | 0.00 |
| Kathon LXE | 1.00 |
| Water | 89.14 |
| Michem™ ME 62330 | 3.33 |
| Total | 1000 |
| Paint characteristics | |
| FCPVC | 35% |
| Total PVC | 18% |

Paint 3

A paint containing aqueous dispersion of polymer-encapsulated pigment Dispersion 1 was prepared using the following procedure to form the aqueous coating composition Paint 3. The ingredients listed in Table 7 (grind) were mixed using a high speed Cowles disperser. The ingredients listed in Table 7 (let down) were added using a conventional lab mixer. The FPVC of the resulting paints is 50%.

TABLE 7

50% FCPVC Aqueous Coating Composition

| Material | Weight (g) |
|---|---|
| Paint formulation | |
| Grind | |
| Water | 80.00 |
| Propylene Glycol | 15.00 |
| Natrosol 250 MBR | 2.00 |
| AMP-95 | 0.50 |
| Orotan™ 1288 | 2.53 |
| Triton™ CF-10 | 1.00 |
| Foamaster NXZ | 1.00 |
| Ti-Pure™ R-706 | 110.00 |
| CC-700 | 80.00 |
| Letdown | |
| Dispersion 1 | 367.17 |
| Latex 1 | 254.72 |
| Tego™ Foamex 825 | 1.00 |
| Primal™ TT-935 | 2.48 |
| AMP-95 | 0.97 |
| Kathon LXE | 1.00 |
| Water | 77.3 |
| Michem™ ME 62330 | 3.33 |
| Total | 1000 |
| Paint characteristics | |
| FCPVC | 50% |
| Total PVC | 30% |

Paint 4

A paint containing no polymer-encapsulated pigment was prepared using the following procedure to form the aqueous coating composition Paint 4. The ingredients listed in Table 8 (grind) were mixed using a high speed Cowles disperser. The ingredients listed in Table 8 (let down) were added using a conventional lab mixer. The FPVC of the resulting paints is 50%.

TABLE 8

50% FCPVC Aqueous Coating Composition

| Material | Weight (g) |
|---|---|
| Paint formulation | |
| Grind | |
| Water | 120.00 |
| Propylene Glycol | 15.00 |
| Natrosol 250 MBR | 2.00 |
| AMP-95 | 0.50 |
| Orotan™ 1288 | 4.00 |
| Triton™ CF-10 | 1.00 |
| Foamaster NXZ | 1.00 |
| Ti-Pure™ R-706 | 220.00 |
| CC-1000 | 80.00 |
| Letdown | |
| Latex 1 | 450.00 |
| Tego™ Foamex 825 | 1.00 |
| Primal™ TT-935 | 2.00 |
| AMP-95 | 0.85 |
| Kathon LXE | 1.00 |
| Water | 96.08 |
| Michem™ ME 62330 | 3.33 |
| Total | 1000 |
| Paint characteristics | |
| FCPVC | 50% |
| Total PVC | 30% |

Paint 5

A paint containing aqueous dispersion of polymer-encapsulated pigment Dispersion 1 was prepared using the following procedure to form the aqueous coating composition Paint 5. The ingredients listed in Table 9 (grind) were mixed using a high speed Cowles disperser. The ingredients listed in Table 9 (let down) were added using a conventional lab mixer. The FPVC of the resulting paints is 78%.

TABLE 9

78 FCPVC Aqueous Coating Composition

| Material | Weight (g) |
|---|---|
| Paint formulation | |
| Grind | |
| Water | 93.32 |
| Propylene Glycol | 9.90 |
| Natrosol 250 MBR | 2.43 |
| AMP-95 | 0.24 |
| OrotanTM 1288 | 2.52 |
| TritonTM CF-10 | 1.20 |
| Foamaster NXZ | 1.00 |
| Ti-PureTM R-706 | 0 |
| CC-1000 | 227.21 |
| Letdown | |
| Dispersion 1 | 562.78 |
| Ropaque Ultra E | 40.00 |
| TegoTM Foamex 825 | 1.00 |
| PrimalTM TT-935 | 3.60 |
| AMP-95 | 0.4 |
| Kathon LXE | 1.00 |
| Water | 33.4 |
| MichemTM ME 62330 | 10.00 |
| Total | 1000 |
| Paint characteristics | |
| FPVC | 78% |
| Total PVC | 52% |

Paint 6

A paint containing no polymer-encapsulated pigment was prepared using the following procedure to form the aqueous coating composition Paint 6. The ingredients listed in Table 10 (grind) were mixed using a high speed Cowles disperser. The ingredients listed in Table 10 (let down) were added using a conventional lab mixer. The FPVC of the resulting paints is 78%.

TABLE 10

78 FCPVC Aqueous Coating Composition

| Material | Weight (g) |
|---|---|
| Paint formulation | |
| Grind | |
| Water | 130.68 |
| Propylene Glycol | 9.90 |
| Natrosol 250 MBR | 2.43 |
| AMP-95 | 0.60 |
| OrotanTM 1288 | 4.36 |
| TritonTM CF-10 | 0.96 |
| Foamaster NXZ | 0.96 |
| Ti-PureTM R-706 | 171.67 |
| CC-1000 | 225.00 |

TABLE 10-continued

78 FCPVC Aqueous Coating Composition

| Material | Weight (g) |
|---|---|
| Letdown | |
| Latex 1 | 300.00 |
| Ropaque Ultra E | 40.00 |
| TegoTM Foamex 825 | 1.00 |
| PrimalTM TT-935 | 4.96 |
| AMP-95 | 0.40 |
| Kathon LXE | 1.00 |
| Water | 96.08 |
| MichemTM ME 62330 | 20.00 |
| Total | 1000 |
| Paint characteristics | |
| FCPVC | 78% |
| Total PVC | 52% |

Paint 7

A paint containing aqueous dispersion of polymer-encapsulated pigment Dispersion 2 and aqueous polymer dispersion Latex 2 was prepared using the following procedure to form the aqueous coating composition Paint 7. The ingredients listed in Table 11 (grind) were mixed using a high speed Cowles disperser. The ingredients listed in Table 11 (let down) were added using a conventional lab mixer. The FPVC of the resulting paints is 84%.

TABLE 11

84 FCPVC Aqueous Coating Composition

| Material | Weight (g) |
|---|---|
| Paint formulation | |
| Grind | |
| Water | 71.34 |
| Propylene Glycol | 7.58 |
| Natrosol 250 MBR | 1.87 |
| AMP-95 | 0.18 |
| OrotanTM 1288 | 1.76 |
| TritonTM CF-10 | 0.89 |
| Foamaster NXZ | 0.76 |
| Ti-PureTM R-706 | 0.00 |
| CC-1000 | 158.04 |
| Letdown | |
| Dispersion 2 | 420.40 |
| Latex 2 | 209.17 |
| TexanolTM | 20.84 |
| TegoTM Foamex 825 | 0.76 |
| PrimalTM TT-935 | 3.60 |
| AMP-95 | 0.4 |
| Kathon LXE | 1.00 |
| Water | 82.41 |
| MichemTM ME 62330 | 20.00 |
| Total | 1000 |
| Paint characteristics | |
| FCPVC | 84% |
| Total PVC | 52% |

Paint 8

A paint containing no polymer-encapsulated pigment was prepared using the following procedure to form the aqueous coating composition Paint 8. The ingredients listed in Table 12 (grind) were mixed using a high speed Cowles disperser. The ingredients listed in Table 12 (let down) were added using a conventional lab mixer. The FPVC of the resulting paints is 84%.

TABLE 12

84 FCPVC Aqueous Coating Composition

| Material | Weight (g) |
|---|---|
| Paint formulation | |
| Grind | |
| Water | 160.00 |
| Propylene Glycol | 10.00 |
| Natrosol 250 MBR | 2.50 |
| AMP-95 | 0.60 |
| OrotanTM 1288 | 4.89 |
| TritonTM CF-10 | 1.00 |
| Foamaster NXZ | 1.00 |
| Ti-PureTM R-706 | 280.00 |
| CC-1000 | 160.00 |
| Letdown | |
| Latex 2 | 255.00 |
| TexanolTM | 20.40 |
| TegoTM Foamex 825 | 1.00 |
| PrimalTM TT-935 | 4.20 |
| AMP-95 | 0.40 |
| Kathon LXE | 1.00 |
| Water | 78.8 |
| MichemTM ME 62330 | 20.00 |
| Total | 1000 |
| Paint characteristics | |
| FCPVC | 84% |
| Total PVC | 52% |

Paint 9

A paint containing aqueous dispersion of polymer-encapsulated pigment Dispersion 3 and aqueous polymer dispersion Latex 3 was prepared using the following procedure to form the aqueous coating composition Paint 9. The ingredients listed in Table 13 (grind) were mixed using a high speed Cowles disperser. The ingredients listed in Table 13 (let down) were added using a conventional lab mixer. The FPVC of the resulting paints is 80%.

TABLE 13

80 FCPVC Aqueous Coating Composition

| Material | Weight (g) |
|---|---|
| Paint formulation | |
| Grind | |
| Water | 110.00 |
| Propylene Glycol | 10.00 |
| Natrosol 250 MBR | 1.60 |
| AMP-95 | 0.40 |
| OrotanTM 1288 | 2.90 |
| TritonTM CF-10 | 1.00 |
| Foamaster NXZ | 1.00 |
| Ti-PureTM R-706 | 0 |
| CC-1000 | 261.17 |
| Letdown | |
| Dispersion 3 | 383.72 |
| Ropaque Ultra E | 140.00 |
| TegoTM Foamex 825 | 1.00 |
| PrimalTM TT-935 | 1.90 |
| AMP-95 | 1.30 |
| Kathon LXE | 1.00 |
| Water | 63.00 |
| MichemTM ME 62330 | 20.00 |
| Total | 1000 |

TABLE 13-continued

80 FCPVC Aqueous Coating Composition

| Material | Weight (g) |
|---|---|
| Paint characteristics | |
| FCPVC | 80% |
| Total PVC | 55% |

Paint 10

A paint containing no polymer-encapsulated pigment was prepared using the following procedure to form the aqueous coating composition Paint 10. The ingredients listed in Table 14 (grind) were mixed using a high speed Cowles disperser. The ingredients listed in Table 14 (let down) were added using a conventional lab mixer. The FPVC of the resulting paints is 80%.

TABLE 14

80 FCPVC Aqueous Coating Composition

| Material | Weight (g) |
|---|---|
| Paint formulation | |
| Grind | |
| Water | 130.00 |
| Propylene Glycol | 10.00 |
| Natrosol 250 MBR | 1.60 |
| AMP-95 | 0.40 |
| OrotanTM 1288 | 3.65 |
| TritonTM CF-10 | 1.00 |
| Foamaster NXZ | 1.00 |
| Ti-PureTM R-706 | 67.67 |
| CC-1000 | 261.17 |
| Letdown | |
| Latex 3 | 316.04 |
| Ropaque Ultra E | 140.00 |
| TegoTM Foamex 825 | 1.00 |
| PrimalTM TT-935 | 3.90 |
| AMP-95 | 1.30 |
| Kathon LXE | 1.00 |
| Water | 41.27 |
| MichemTM ME 62330 | 20.00 |
| Total | 1000 |
| Paint characteristics | |
| FCPVC | 80% |
| Total PVC | 55% |

Paint 11

A paint containing aqueous dispersion of polymer-encapsulated pigment Dispersion 1 and aqueous polymer dispersion Latex 1 was prepared using the following procedure to form the aqueous coating composition Paint 11. The ingredients listed in Table 15 (grind) were mixed using a high speed Cowles disperser. The ingredients listed in Table 15 (let down) were added using a conventional lab mixer. The FPVC of the resulting paints is 107%.

TABLE 15

107 FCPVC Aqueous Coating Composition

| Material | Weight (g) |
|---|---|
| Paint formulation | |
| Grind | |
| Water | 140.00 |
| Propylene Glycol | 15.00 |

TABLE 15-continued

107 FCPVC Aqueous Coating Composition

| Material | Weight (g) |
|---|---|
| Natrosol 250 MBR | 1.00 |
| AMP-95 | 0.50 |
| Orotan™ 1288 | 2.89 |
| Triton™ CF-10 | 1.00 |
| Foamaster NXZ | 1.00 |
| DB-80 | 40.00 |
| CC-700 | 245.00 |
| Letdown | |
| Dispersion 1 | 400.52 |
| Latex 1 | 6.49 |
| Ropaque Ultra E | 85.00 |
| Tego™ Foamex 825 | 1.00 |
| Primal™ TT-935 | 1.98 |
| AMP-95 | 0.40 |
| Kathon LXE | 1.00 |
| Water | 20.55 |
| Michem™ ME 62330 | 36.67 |
| Total | 1000 |
| Paint characteristics | |
| FCPVC | 107% |
| Total PVC | 64% |

Paint 12 to Paint 13

Paint 12 to Paint 13 (containing Dispersion 1) were prepared following the procedure for preparation of Paint 11. The difference is Paint 12 to Paint 13 contain paraffin wax emulsion (Michem™ Emulsion 62330) with variations in amounts based on Table 21. In addition, appropriate adjustment of weights of Primal™ TT-935 and AMP-95 in letdown process were done such that the resulting paints have a KU viscosity of 90 to 130 Kreb Unit, and a pH of 8.0 to 9.0.

Paint 14

A paint containing no polymer-encapsulated pigment was prepared using the following procedure to form the aqueous coating composition Paint 14. The ingredients listed in Table 16 (grind) were mixed using a high speed Cowles disperser. The ingredients listed in Table 16 (let down) were added using a conventional lab mixer. The FPVC of the resulting paints is 107%.

TABLE 16

107 FCPVC Aqueous Coating Composition

| Material | Weight (g) |
|---|---|
| Paint formulation | |
| Grind | |
| Water | 180.00 |
| Propylene Glycol | 15.00 |
| Natrosol 250 MBR | 2.00 |
| AMP-95 | 0.50 |
| Orotan™ 1288 | 4.00 |
| Triton™ CF-10 | 1.00 |
| Foamaster NXZ | 1.00 |
| Ti-Pure™ R-706 | 120.00 |
| DB-80 | 40.00 |
| CC-700 | 245.00 |
| Letdown | |
| Latex 1 | 220.00 |
| Ropaque Ultra E | 85.00 |
| Tego™ Foamex 825 | 1.00 |
| Primal™ TT-935 | 4.96 |
| AMP-95 | 0.40 |
| Kathon LXE | 1.00 |
| Water | 40.66 |
| Michem™ ME 62330 | 43.84 |
| Total | 1000 |
| Paint characteristics | |
| FCPVC | 107% |
| Total PVC | 64% |

Paint 15

A paint containing aqueous dispersion of polymer-encapsulated pigment Dispersion 1 was prepared using the following procedure to form the aqueous coating composition Paint 15. The ingredients listed in Table 17 (grind) were mixed using a high speed Cowles disperser. The ingredients listed in Table 17 (let down) were added using a conventional lab mixer. The FPVC of the resulting paints is 90%.

TABLE 17

90 FCPVC Aqueous Coating Composition

| Material | Weight (g) |
|---|---|
| Paint formulation | |
| Grind | |
| Water | 74.63 |
| Propylene Glycol | 9.33 |
| Natrosol 250 MBR | 1.40 |
| AMP-95 | 0.47 |
| Orotan™ 1288 | 3.65 |
| Triton™ CF-10 | 0.93 |
| Foamaster NXZ | 0.93 |
| CC-700 | 186.57 |
| Letdown | |
| Dispersion 1 | 472.34 |
| Ropaque Ultra E | 114.45 |
| Texanol™ | 11.22 |
| Tego™ Foamex 825 | 2.25 |
| Primal™ TT-935 | 1.50 |
| AMP-95 | 0.40 |
| Kathon LXE | 1.00 |
| Water | 110.54 |
| Michem™ ME 71450 | 10.00 |
| Total | 1000 |
| Paint characteristics | |
| FCPVC | 90% |
| Total PVC | 60% |

Paint 16

A paint containing no polymer-encapsulated pigment was prepared using the following procedure to form the aqueous coating composition Paint 16. The ingredients listed in Table 18 (grind) were mixed using a high speed Cowles disperser. The ingredients listed in Table 18 (let down) were added using a conventional lab mixer. The FPVC of the resulting paints is 90%.

TABLE 18

90 FCPVC Aqueous Coating Composition

| Material | Weight (g) |
|---|---|
| *Paint formulation* | |
| Grind | |
| Water | 74.63 |
| Propylene Glycol | 9.33 |
| Natrosol 250 MBR | 1.40 |
| AMP-95 | 0.47 |
| OrotanTM 1288 | 3.65 |
| TritonTM CF-10 | 0.93 |
| Foamaster NXZ | 0.93 |
| Ti-PureTM R-706 | 141.50 |
| CC-700 | 186.57 |
| Letdown | |
| Latex 1 | 252.00 |
| Ropaque Ultra E | 114.45 |
| TexanolTM | 11.22 |
| TegoTM Foamex 825 | 2.25 |
| PrimalTM TT-935 | 4.60 |
| AMP-95 | 0.40 |
| Kathon LXE | 1.00 |
| Water | 189.00 |
| MichemTM ME 71450 | 10.00 |
| Total | 1000 |
| *Paint characteristics* | |
| FCPVC | 90% |
| Total PVC | 60% |

Paint 17

A paint containing aqueous dispersion of polymer-encapsulated pigment Dispersion 1 was prepared using the following procedure to form the aqueous coating composition Paint 17. The ingredients listed in Table 19 (grind) were mixed using a high speed Cowles disperser. The ingredients listed in Table 19 (let down) were added using a conventional lab mixer. The FPVC of the resulting paints is 110%.

TABLE 19

110 FCPVC Aqueous Coating Composition

| Material | Weight (g) |
|---|---|
| *Paint formulation* | |
| Grind | |
| Water | 112.76 |
| Propylene Glycol | 14.10 |
| Natrosol 250 MBR | 2.11 |
| AMP-95 | 0.70 |
| OrotanTM 1288 | 4.01 |
| TritonTM CF-10 | 1.41 |
| Foamaster NXZ | 1.41 |
| CC-700 | 281.90 |
| Letdown | |
| Dispersion 1 | 264.51 |
| Ropaque Ultra E | 161.77 |
| TexanolTM | 8.33 |
| TegoTM Foamex 825 | 1.41 |
| PrimalTM TT-935 | 1.70 |
| AMP-95 | 0.30 |
| Kathon LXE | 1.00 |
| Water | 124.57 |
| MichemTM ME 71450 | 20.00 |
| Total | 1000 |

TABLE 19-continued

110 FCPVC Aqueous Coating Composition

| Material | Weight (g) |
|---|---|
| *Paint characteristics* | |
| FCPVC | 110% |
| Total PVC | 77% |

Paint 18

A paint containing no polymer-encapsulated pigment was prepared using the following procedure to form the aqueous coating composition Paint 18. The ingredients listed in Table 20 (grind) were mixed using a high speed Cowles disperser. The ingredients listed in Table 20 (let down) were added using a conventional lab mixer. The FPVC of the resulting paints is 110%.

татBLE 20

110 FCPVC Aqueous Coating Composition

| Material | Weight (g) |
|---|---|
| *Paint formulation* | |
| Grind | |
| Water | 74.63 |
| Propylene Glycol | 9.33 |
| Natrosol 250 MBR | 1.40 |
| AMP-95 | 0.47 |
| OrotanTM 1288 | 3.65 |
| TritonTM CF-10 | 0.93 |
| Foamaster NXZ | 0.93 |
| Ti-PureTM R-706 | 141.50 |
| CC-700 | 186.57 |
| Letdown | |
| Latex 1 | 252.00 |
| Ropaque Ultra E | 114.45 |
| TexanolTM | 11.22 |
| TegoTM Foamex 825 | 2.25 |
| PrimalTM TT-935 | 4.60 |
| AMP-95 | 0.40 |
| Kathon LXE | 1.00 |
| Water | 189.00 |
| MichemTM ME 71450 | 10.00 |
| Total | 1000 |
| *Paint characteristics* | |
| FCPVC | 110% |
| Total PVC | 77% |

TABLE 21

| | Paint Composition | | | Paint Characteristics | | | |
|---|---|---|---|---|---|---|---|
| Paint ID | Dispersion ID and/or Latex ID* | Michem ™ Emulsion 62330%[e] | Encapsulated TiO₂%[f] | FCPVC | TiO₂ PVC[g] | KU[h] | pH |
| 11 | 1/1* | 3.7% | 100% | 107% | 11% | 98.2 | 8.86 |
| 12 | 1/1* | 2.7% | 100% | 107% | 11% | 92.7 | 8.89 |
| 13 | 1/1* | 4.3% | 100% | 107% | 11% | 96.4 | 8.79 |

[e]Michem ™ Emulsion 62330% = the weight percentage of Michem ™ Emulsion 62330 based on total formulation
[f]Encapsulated TiO₂% = the weight percentage of encapsulated TiO₂ based on total TiO₂ in the formulation
[g]TiO₂ PVC = the pigment volume concentration of total TiO₂ in the formulation
[h]KU = mid shear rate viscosity after equilibration, measured by Stomer Viscometer
Wherein, the number marked with "*" in table 21 is the Latex ID number used in the coating composition.

III. Results of Hydrophilic Stain Repellency of Aqueous Coating Compositions

Table 22 lists the hydrophilic stain repellency of Paint 1 to Paint 18.

TABLE 22

| Paint ID | FCPVC of the coating composition | Wax dry weight percent on the wet paint weight | TiO2, PVC/ Encapsulated TiO2, weight percent | Hydrophilic Stain Repellency No. |
|---|---|---|---|---|
| 1 | 35% | 0.10% | 18%/100% | 10 |
| 2 | 35% | 0.10% | 18%/0% | 5 |
| 3 | 50% | 0.10% | 19%/50% | 3 |
| 4 | 50% | 0.10% | 19%/0% | 2 |
| 5 | 78% | 0.30% | 15%100% | 2 |
| 6 | 78% | 0.60% | 15%/0% | 0 |
| 7 | 85% | 0.60% | 28%/100% | 5 |
| 8 | 85% | 0.60% | 28%/0% | 0 |
| 9 | 80% | 0.60% | 5%/100% | 4 |
| 10 | 80% | 0.60% | 5%/0% | 0 |
| 11 | 107% | 1.10% | 11%/100% | 6 |
| 12 | 107% | 0.80% | 11%/100% | 5 |
| 13 | 107% | 1.30% | 11%/100% | 7 |
| 14 | 107% | 1.30% | 11%/0% | 0 |
| 15 | 90% | 0.50% | 13%/100% | 5 |
| 16 | 90% | 0.50% | 13%/0% | 0 |
| 17 | 110% | 1.00% | 7%/100% | 3 |
| 18 | 110% | 1.00% | 7%/0% | 1 |

Paint 2, Paint 4, Paint 6, Paint 8, Paint 10, Paint 14, Paint 16 and Paint 18 are comparative examples with TiO2 un-encapsulated in the dispersions, the compositions of them are listed above.

The results in the above table indicate that the hydrophilic stain repellency of dry coatings is improved as aqueous coating composition contains aqueous dispersion of polymer encapsulated pigment. When aqueous dispersion of polymer encapsulated pigment exists, wax dosage can be less to maintain the same hydrophilic stain repellency, compared with the coating composition with the art pigment. Overall, wax efficiency is increased by applying aqueous dispersion of polymer-encapsulated pigment.

The invention claimed is:

1. An aqueous coating composition, wherein said aqueous coating composition has a pigment volume concentration of total titanium dioxide from 5% to 30%, has a fraction of critical pigment volume concentration of from 35% to 110%, and comprises:
(i) a pigment composition, including 15 wt. % to 100 wt. %, based on the dry weight of the pigment composition, of polymer-encapsulated titanium dioxide; and 0 to 85 wt. %, based on the dry weight of the pigment composition, of un-encapsulated titanium dioxide;
wherein the polymer of the polymer-encapsulated pigment comprises 95 to less than 100 wt. % of copolymerized ethylenically unsaturated nonionic monomers comprising butyl acrylate and at least two ethylenically unsaturated monomers selected from methyl methacrylate, ethylhexyl acrylate, vinyl acetate, vinyl tert-decanoate, styrene, 2-(2-acetoacetyloxy)ethyl methacrylate, ureido methacrylate, and benzophenone; and
greater than 0 and less than or equal to 5 wt. % of a copolymerized ethylenically unsaturated monomer selected from acrylic acid, itaconic acid, sodium vinyl sulfonate, acrylamide, and combinations thereof;
wherein the polymer of the polymer-encapsulated titanium dioxide has a minimum film formation temperature (MFFT) of from −35° C. to 60° C.; and
(ii) 0.01 wt. % to 1.3 wt. %, by dry weight based on the wet weight of the aqueous coating composition, of at least one paraffin wax emulsion.

2. The aqueous coating composition according to claim 1, wherein the polymer-encapsulated titanium dioxide has a polymer shell having an average thickness of 10 nanometers to 200 nanometers.

3. The aqueous coating composition according to claim 1, wherein the polymer of the polymer-encapsulated titanium dioxide comprises further, based on the dry weight of the said polymer, up to 5 wt. % of at least one surfactant.

4. The aqueous coating composition according to claim 1, wherein the total pigment volume concentration of the coating composition is from 18% to 77%.

5. The aqueous coating composition according to claim 1, wherein the titanium dioxide in the polymer-encapsulated titanium dioxide has a weight percent based on the total titanium dioxide in the aqueous coating composition of from 50 wt. % to 100 wt. %.

6. The aqueous coating composition according to claim 1, wherein the paraffin wax emulsion comprises polyethylene wax, carnauba wax, ethylene acrylic acid copolymer, or a mixture thereof, with an average particle diameter from 0.02 to 1.5 microns.

7. The aqueous coating composition according to claim 1, wherein the coating composition further comprises at least one water dispersible or soluble polymer with an average particle diameter of from 50 to 800 nanometers and a minimum film formation temperature (MFFT) of from −35° C. to 60° C.

8. The aqueous coating composition according to claim 1, wherein the aqueous coating composition comprises 0.01 wt.

% to 1 wt. % of the at least one paraffin wax emulsion, by dry weight based on the wet weight of the aqueous coating composition.

9. The aqueous coating composition according to claim 1, wherein the aqueous coating composition comprises 0.01 wt. % to 0.6 wt. % of the at least one paraffin wax emulsion, by dry weight based on the wet weight of the aqueous coating composition.

10. The aqueous coating composition according to claim 1, wherein the aqueous coating composition comprises 0.01 wt. % to 0.3 wt. % of the at least one paraffin wax emulsion, by dry weight based on the wet weight of the aqueous coating composition.

11. The aqueous coating composition according to claim 1, wherein a dried paint film formed from the aqueous coating composition has improved hydrophilic stain repellency compared to a dried paint film formed from the same coating composition in which the titanium dioxide is unencapsulated.

12. The aqueous coating composition according to claim 1, wherein the polymer of the polymer-encapsulated pigment comprises:

95 to less than 100 wt. % of copolymerized ethylenically unsaturated nonionic monomers comprising butyl acrylate, methyl methacrylate, ureido methacrylate, and benzophenone, and greater than 0 and less than or equal to 5 wt. % of copolymerized ethylenically unsaturated monomer comprising itaconic acid and acrylamide;

95 to less than 100 wt. % of at least two copolymerized ethylenically unsaturated nonionic monomers comprising butyl acrylate, styrene, 2-(2-acetoacetyloxy)ethyl methacrylate, and greater than 0 and less than or equal to 5 wt. % of acrylic acid; or 95 to less than 100 wt. % of copolymerized ethylenically unsaturated nonionic monomers comprising butyl acrylate, ethylhexyl acrylate, vinyl acetate, and vinyl tert-decanoate, and greater than 0 and less than or equal to 5 wt. % of copolymerized ethylenically unsaturated monomer comprising acrylamide and sodium vinyl sulfonate.

\* \* \* \* \*